Figure 1:
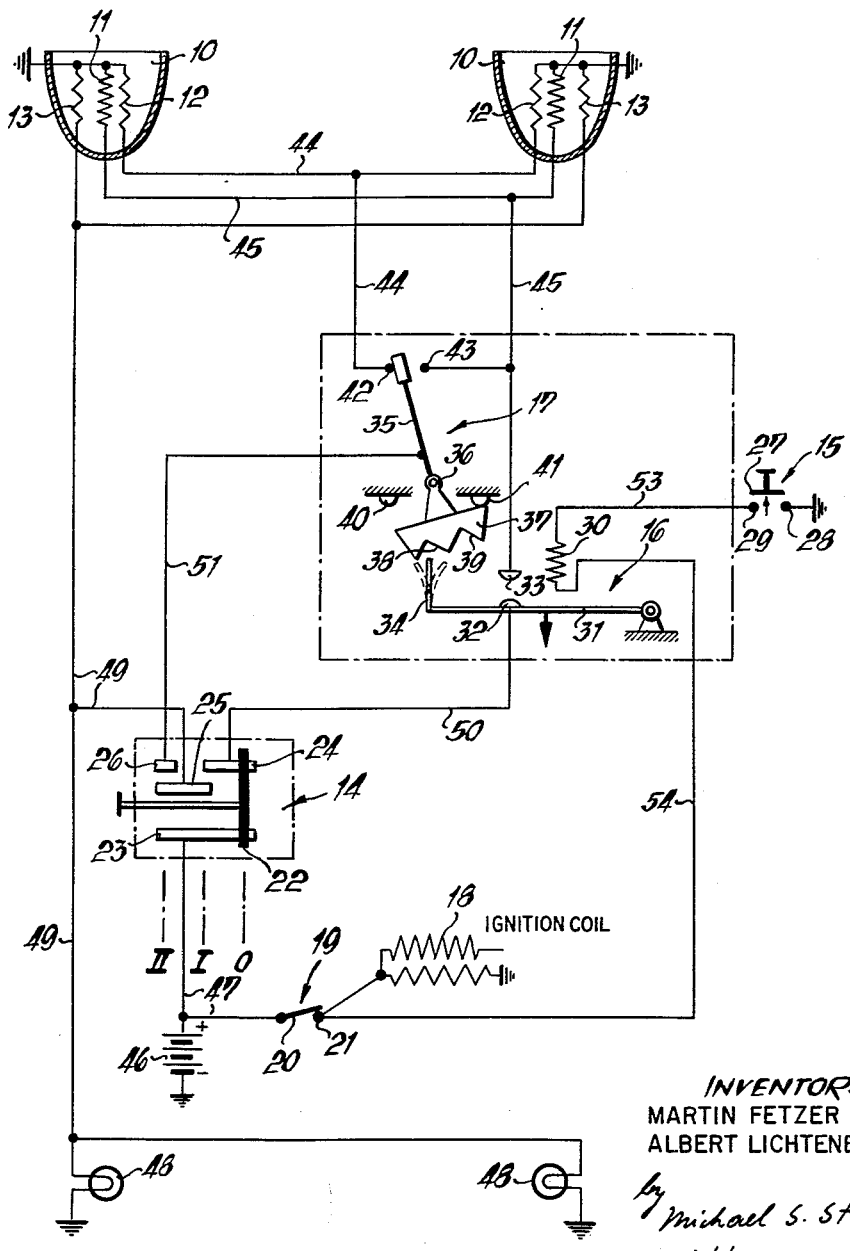

INVENTORS
MARTIN FETZER
ALBERT LICHTENBERGER by Michael S. Striker
Attorney

United States Patent Office 3,135,893
Patented June 2, 1964

3,135,893
HEADLIGHT CONTROL ARRANGEMENT
Martin Fetzer and Albert Lichtenberger, both of Stuttgart, Germany, assignors to Robert Bosch G.m.b.H., Stuttgart, Germany
Filed Jan. 3, 1962, Ser. No. 163,986
Claims priority, application Germany Jan. 4, 1961
8 Claims. (Cl. 315—83)

This invention concerns a headlight control arrangement, and more particularly an arrangement for controlling the light emission of the headlights of a vehicle, particularly of motor vehicles.

An arrangement of this kind conventionally includes a main control switch having a first position which is used while driving at day-time and in which all the lights are switched off, a second position for switching on the parking lights, and a third position which is used during driving at night in which the headlights are switched on and may be used either with a high beam filament or a low beam filament being in operation. In addition, usually a separate switch is provided which is operable either by hand or by foot and which serves to change between high beam operation and low beam operation. An electromagnetic relay may be provided which is controlled by the just mentioned additional switch and which causes the changes between high beam and low beam operations.

Ordinarily the additional switch and the relay are not effective unless the main switch is in the position which is normally used for driving at night and which permits the use of the high beam and low beam filaments. However, it has been found that it is highly desirable to be able to produce light signals with one or the other of the high beam and low beam filaments also at daytime i.e. when the main switch is in a position for switching on only the parking lights or in the position in which all the lights are switched off. It is among the objects of this invention to provide for a headlight control arrangement in which by operation of the additional switch light signals can be produced even when the main switch is not in the position in which the headlights are switched on or in a position in which only the parking lights are switched on.

It is a further object of this invention to provide for an arrangement as set forth in which the relay ordinarily used for changing between high beam operation and low beam operation includes means for accomplishing the desired result, i.e. without resorting to an additional relay and an additional switch.

With above objects in view the invention includes in a headlight control arrangement, in combination, headlight means including a high beam filament and a low beam filament; main electrical circuit means alternatively connectable to said high beam filament and to said low beam filament, respectively, for energizing the filament to which it is connected; control means associated with said electrical circuit means and movable between two positions in one of which said electrical circuit means is connected to one of said filaments and in the other of which it is connected to the other one of said filaments; main switch means in said main electrical circuit means movable between a circuit closing position in which said main electrical circuit means is adapted to energize the filament to which it is connected, and a circuit opening position in which said main electrical circuit means cannot energize the filament to which it is connected; additional electrical circuit means for energizing one of said filaments only when said main switch means is in said circuit opening position; additional switch means in said additional electrical circuit means movable between circuit opening and circuit closing positions; and actuating means for simultaneously moving said control means between said two positions thereof and said additional switch means between said circuit opening and circuit closing positions thereof.

Figure 2:
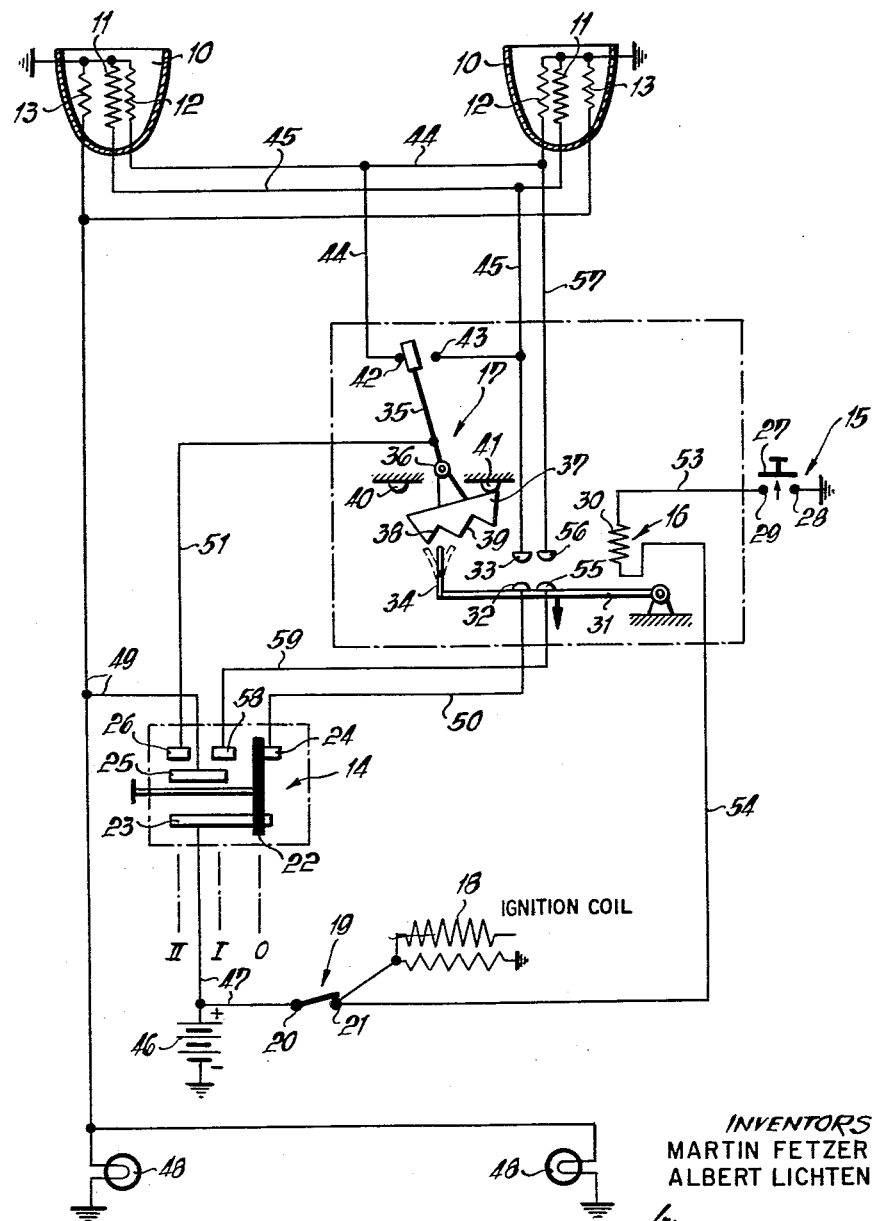
Figure 3:
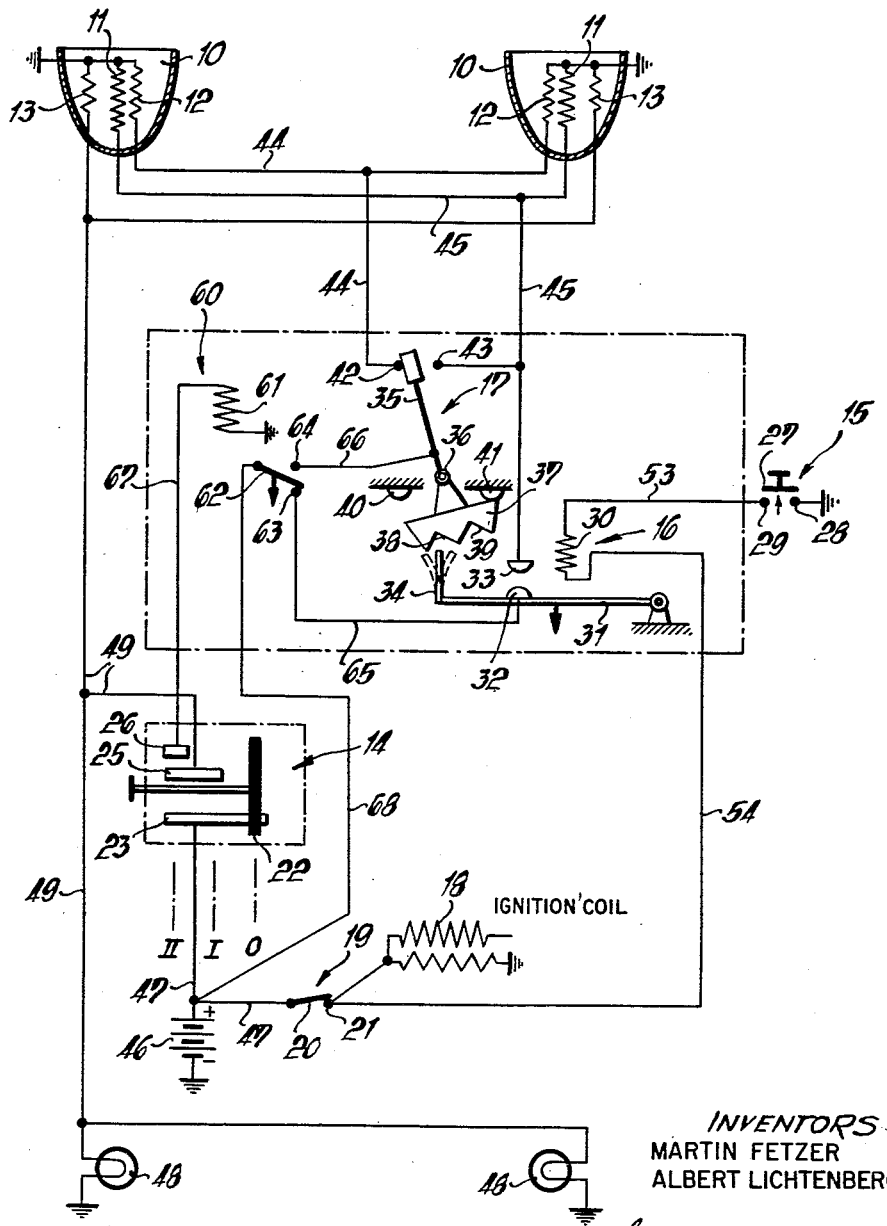

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic illustration of one embodiment of the invention in which one pair of additional contacts in a control relay is so connected with the main switch that high beam light signals can be given while the main switch is either in "lights off" position or in "parking light" position;

FIG. 2 is a diagrammatic illustration of a second embodiment of the invention in which a first pair of contacts of the relay is so connected with the main switch that high beam light signals can be given when the main switch is in "lights off" position and a second pair of contacts of the relay is so connected with the main switch that low beam light signals can be given when the main switch is in "parking light" position; and FIG. 3 is a diagrammatic illustration of a third embodiment of the invention in which a pair of contacts of the relay is connected via a secondary relay with the source of electrical energy, while the secondary relay is so connected with the main switch that said secondary relay permits giving high beam light signals only as long as the main switch is in a position different from that in which the headlights are switched on.

In FIGS. 1-3 two headlights 10 are shown diagrammatically, any individual bulbs being omitted for the sake of clarity. Instead in every headlight a high beam filament 11, a low beam filament 12 and a parking light filament 13 are shown, all of them being connected at one end with ground. Both high beam filaments are connected in parallel with each other, and the same applies to the two low beam filaments and the two parking light filaments.

Referring now to FIG. 1, the headlight control arrangement comprises mainly a main switch or light selector switch 14 and a normally open pushbutton type switch 15 for controlling an electromagnetic relay 16 which, in turn, actuates a change-over switch 17 for changing between high beam operation and low beam operation, and additionally controls a circuit for operating the high beam filament.

For the sake of completeness an ignition switch 19 is shown which includes a movable switch arm 20 and a stationary contact 21 which is connected with the ignition coil 18 of an ignition installation not shown.

The selector or main switch 14 has a movable contact member 22 which may be placed arbitrarily in any one of three positions indicated by dash-dotted lines marked O, I, and II. The position O is used at daytime with the lights switched off, the position I is used for switching on the parking lights, and position II is used for driving at night with either the high beam or the low beam filaments switched on. In position O the slidable member 22 is in conductive engagement with the stationary contact members 23 and 24, in position I it is in conductive arrangement with the stationary members 23, 24 and 25, and in position II it is in conductive engagement with the members 23, 25 and 26.

The pushbutton switch 15 has two stationary contacts 28 and 29 and a normally removed contact member 27 which may be moved into a circuit closing position connecting the contacts 28 and 29.

The electromagnetic relay 16 has a solenoid coil 30 and a movable armature 31 which is normally urged by means not shown but indicated by an arrow into the idle position illustrated in FIG. 1, but will be moved upon energization of the coil 30 in opposite direction so as to cause conductive engagement between a contact 32 carried by the armature 31, and a stationary contact 33. The far end of the member 31 carries a flexible control member 34 for actuating the change-over switch 17.

The change-over switch 17 comprises a tiltable contact arm 35 pivoting at 36 and connected with a mechanical control member 37 having two tapered notches 38 and 39. The assembly 35, 37 is urged by means, not shown, to assume either one of its limit positions in which it abuts against one of the stops 40 or 41. When the switch 17 is in the position shown, its contact member 35 is in conductive engagement with the stationary contact 42, while in the opposite position it would be in engagement with the other stationary contact 43. When, in the position shown, the armature 31 is attracted by the coil 30 the control member 34 would engage the notch 38 and move the assembly 35, 37 into its opposite position. The next following energization of the coil 30 and attraction of the armature 31 would cause the member 34 to engage the notch 39 and to move thereby the assembly 35, 37 back to the position shown in FIG. 1.

The contact 42 is connected by a line 44 with the low beam filaments 12, while contact 43 is connected by line 45 with the high beam filaments 11. However, the contact 43 is also connected with the above-mentioned stationary contact 33. The contact arm 35 is connected by line 51 with the contact member 26 of the main switch 14. A source of electrical energy, e.g. a battery 46 has its negative terminal connected to ground. The positive terminal of the battery 46 is connected by one branch of a line 47 with the contact member 23 of the mainswitch 14, and by another branch with the ignition switch 19. The parking light filaments 13 of the headlights 10 as well as the tail lights 48 are connected by line 49 with the contact member 25 of the switch 14. From the contact member 24 a line 50 is taken to the contact 32 on the armature 31 of the relay 16. The contact 28 of the switch 15 is connected to ground while the contact 29 is connected by line 53 with one end of the coil 30 the other end of which is connected by the line 54 to the contact 21 of the ignition switch 19.

Preferably the electromagnetic relay 16 and the change-over switch 17 are structurally combined into one unit represented by the dash-dotted frame.

In operation the arrangement according to FIG. 1 functions as follows:

If during daytime driving i.e. with ignition switch 19 closed and main switch 14 in position O, the pushbutton switch 15 is moved to closed position, current flows from the positive terminal of the battery 46 through line 47, ignition switch 19, line 54, solenoid coil 30 of the relay 16, line 53 and closed switch 15 to ground. Consequently the relay 16 is energized. The armature 31 is moved into operative position in which the contact 32 engages the contact 33. Simultaneously the movement of the armature 31 causes the control member 34 to move in the manner described above the contact arm 35 of the switch 17 into position in which it engages the contact 43. Since however the member 35 is not connected through the switch 14 with the battery 46, the change-over switch 17 is ineffective so that it is not capable of causing energization of the high beam or low beam filaments 11, 12. However, current flows via contact members 23, 22 and 24 and through line 50 to contact 32 and from there through contact 33 and line 45 to the high beam filaments 11. Consequently the high beam filaments emit light as long as the pushbutton switch 15 is held in closed position. When this switch is released the armature 31 returns to normal position. By repeatedly operating the switch 15 a blinking high beam light signal can be given.

In case that the member 22 of the main switch 14 is moved to position I, so as to switch on the parking light filaments 13, the above described operation is exactly the same. The only difference is that now additionally current flows from the battery through line 47 via members 23, 22 and 25, and through lines 49 also to the parking light filaments 13 and to the tail lights 48.

If however the member 22 of the main switch is moved to the position II then current flows from the battery through the members 23, 22, 25 and 26 to the parking light filaments 13, the tail lights 48 and to the contact arm 35 of the switch 17. If the switch 17 is in the position shown in FIG. 1, the current flows from the member 35 through contact 42 and lines 44 also to the low beam filaments 12. Should however the switch 17 be in its opposite position then the current would flow from contact 43 through line 45 to the high beam filaments 11.

If under these conditions the switch button 15 is actuated the relay 16 is again energized and the armature 31 is attracted. Depending upon the actual position of the switch 17 high beam operation is changed to low beam operation, or vice versa.

However, since the member 22 of switch 14 does now not connect the contact members 23 and 24 no current can flow through line 50 and the closed contacts 22, 33 so that the above described operation of the high beam and low beam filaments 11, 12 is not influenced by the engagement of the contacts 32 and 33 while the switch 15 is held in closed position. Repeated operation of the switch 15 causes only a switching between high beam and low beam operation through the action of the armature member 34 on the assembly 35, 37.

It can be seen that in the arrangement described above energization of the high beam filaments 11 can be achieved by actuating the switch 15 as long as the main switch 14 is either in position O or in position I. However, if the switch 14 is in position II the operation of the switch 15 results only in changing from high beam operation to low beam operation, or vice versa.

Referring now to FIG. 2, it is to be noted that generally the arrangement is the same as that one described in reference to FIG. 1. The only difference between FIG. 2 and FIG. 1 is the following: In switch 14 the contact member 24 is only so short that it cannot be engaged by the member 22 except when the latter is in position O. An additional contact member 58 is provided which is engaged by the member 22 when the latter is in the position I. Further, the armature 31 carries a further contact 55 adapted to engage a stationary contact 56. The contact member 58 is connected by line 59 with contact 55, and the contact 56 is connected by a line 57 with a junction point in the line 44 mentioned above and connected to the low beam filaments 12.

Consequently, the arrangement of FIG. 2 operates in exactly the same manner as described above for the embodiment of FIG. 1 provided that the main switch 14 is either in the position O or in the position II. If however the switch 14 is in position I for switching on the parking light filaments, and if now the switch 15 is actuated so that the contacts 32 and 55 engage the respectively corresponding contacts 33 and 56, current flows not only from the battery via contact members 23, 22, 25 and lines 49 to the parking light filaments 13 and to the tail lights 48, but also from contact 58 via line 59, closed contact 55, 56 and line 57 to the low beam filaments 12. Consequently, the low beam filaments 12 emit light as long as the switch 15 is held in closed position. By repeatedly actuating the switch 15 light signals can be given with the low beam filaments 12. This arrangement and this type of operation is desirable in areas where regulations call for driving with parking lights only at night time so that signaling with high beam emission is not permitted.

Referring now to the embodiment illustrated by FIG. 3, it can be seen that the arrangement differs from the embodiment of FIG. 1 in the following manner: The main switch 14 has no contact member 24. A secondary relay 60 is provided which has a coil 61 connected between the contact member 26 of switch 14 and ground. This relay includes a movable armature arm 62 urged normally by means, not shown, but indicated by the arrow, into the position shown in FIG. 3. The contact arm 62 is connected by line 68 directly with the positive terminal of battery 46. In the position shown the contact arm 62 is in engagement with a stationary contact 63 connected by line 65 with the contact 32 on the armature 31 of relay 16. When relay 60 is energized the arm 62 moves into engagement with the stationary contact 64 which is connected by line 66 with the movable contact arm 35 of change-over switch 17.

In the same manner as described for the embodiment of FIG. 1 repeated operation of the switch 15 will result in high beam signals provided that the main switch 14 is either in position O or in position I. However, if the switch 14 is moved to position II the relay coil 61 is energized and the contact arm 62 moved into the position engaging contact 64. Now the contacts 32, 33 are rendered ineffective but every operation of the switch 15 causes a change between high beam operation and low beam operation.

Preferably the relays 60, 16 and the switch 17 are assembled as a structural unit as indicated by the dash-dotted frame.

It will be understood that each of the elements described above, or two or more together, may also find a useful application in other types of a headlight control arrangement differing from the types described above.

While the invention has been illustrated and described as embodied in an arrangement for controlling the light emission of vehicle headlights, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a headlight control arrangement, in combination, headlight means including a high beam filament and a low beam filament; main electrical circuit means alternatively connectable to said high beam filament and to said low beam filament, respectively, for energizing the filament to which it is connected; control means associated with said electrical circuit means and movable between a position in which said electrical circuit means is connected to one of said filaments and a position in which it is connected to the other one of said filaments; main switch means in said main electrical circuit means movable between a circuit closing position in which said main electrical circuit means is adapted to energize the filament to which it is connected, and a circuit opening position in which said main electrical circuit means cannot energize the filament to which it is connected; additional electrical circuit means for energizing one of said filaments only when said main switch means is in said circuit opening position; additional switch means in said additional electrical circuit means movable between circuit opening and circuit closing positions; and actuating means operatively connected with said control means and with said additional switch means for simultaneously moving said control means between said two positions thereof and said additional switch means between said circuit opening and closing positions thereof.

2. In a headlight control arrangement, in combination, headlight means including a high beam filament and a low beam filament; main electrical circuit means alternatively connectable to said high beam filament and to said low beam filament, respectively, for energizing the filament to which it is connected; control means associated with said electrical circuit means and movable between a position in which said electrical circuit means is connected to one of said filaments and a position in which it is connected to the other one of said filaments; main switch means in said main electrical circuit means movable between a circuit closing position in which said main electrical circuit means is adapted to energize the filament to which it is connected, and a circuit opening position in which said main electrical circuit means cannot energize the filament to which it is connected; additional electrical circuit means for energizing one of said filaments only when said main switch means is in said circuit opening position; additional switch means in said additional electrical circuit means movable between circuit opening and circuit closing positions; and electromagnetic actuating means for simultaneously moving said control means between said two positions thereof and said additional switch means between said circuit opening and closing positions thereof.

3. In a headlight control arrangement, in combination, headlight means including a high beam filament, a low beam filament and a parking light filament; main electrical circuit means alternatively connectable to said high beam filament, to said low beam filament, and to said parking light filament, respectively, for energizing the filament to which it is connected; control means associated with said electrical circuit means and movable between a position in which said electrical circuit means is connected to said high beam filament and a position in which it is connected to said low beam filament; main switch means in said main electrical circuit means movable between a circuit closing position in which said main electrical circuit means is adapted to energize that of said high and low beam filaments to which it is connected, and a circuit opening position in which said electrical circuit means cannot energize that of said high and low beam filaments to which it is connected, and a third position in which said main electrical circuit means is adapted to energize said parking light filament; additional electrical circuit means for energizing one of said high beam and low beam filaments only when said mean switch means is in said circuit opening position and for energizing said low beam filament when said main switch means is in said third position; additional switch means in said additional electrical circuit means movable between circuit opening and circuit closing positions; and actuating means operatively connected with said control means and with said additional switch means for simultaneously moving said control means between said two positions thereof and said additional switch means between said circuit opening and closing positions thereof.

4. In a headlight control arrangement, in combination, headlight means including a high beam filament, a low beam filament and a parking light filament; main electrical circuit means alternatively connectable to said high beam filament, to said low beam filament, and to said parking light filament, respectively, for energizing the filament to which it is connected; control means associated with said electrical circuit means and movable between a position in which said electrical circuit means is connected to said high beam filament and a position in which it is connected to said low beam filament; main switch means in said main electrical circuit means movable between a circuit closing position in which said main electrical circuit means is adapted to energize that of said high beam and low beam filaments to which it is connected, and a circuit opening position in which said electrical circuit means cannot energize that of said high beam and low beam filaments to which it is connected, and a third position in which said main electrical circuit means is adapted to energize said parking light filament; additional electrical circuit means for energizing one of said high beam and low beam filaments only when said main switch means is in said circuit opening position and for energizing said low beam filament when said main switch means is in said third position; additional switch means in said additional electrical circuit means movable between circuit opening and circuit closing positions; and electromagnetic actuating means for simultaneously moving said control means between said two positions thereof and said additional switch means between said circuit opening and closing positions thereof.

5. In an arrangement for controlling the light emission of vehicle headlights, in combination,
   a source of electric energy having two poles;
   headlight means including a high beam filament, a low beam filament and a parking light filament, each of said filaments being connected at one end with one pole of said source;
   selector switch means movable between an "off" position and a plurality of "on" positions and arranged between the other pole of said source and said headlight means for selectively controlling the energization of any one of said filaments;
   relay means including a coil in circuit with said source, and change-over contacts, and being movable by energization of said coil between a first position of said contacts in which said high beam filament is connected in circuit with said source and a second position of said contacts in which said low beam filament is connected in circuit with said source, said relay means cooperating with said selector switch means in such a manner that said change-over contacts are effective only when said selector switch means is in a position permitting energization of said high beam filament, said relay means having at least one additional pair of normally open contacts connected in circuit with said source and one of said high beam and low beam filaments for causing, when said coil is energized, energization of one of said high beam and low beam filaments when said selector switch means is in a position different from said position permitting energization of said high beam filament; and
   normally open switch means connected in said circuit between said coil and said source for causing, when moved to closed position, energization of said coil of said relay means.

6. In an arrangement for controlling the light emission of vehicle headlights, in combination,
   a source of electric energy having two poles;
   headlight means including a high beam filament, a low beam filament and a parking light filament, each of said filaments being connected at one end with one pole of said source;
   selector switch means movable between an "off" position and a plurality of "on" positions and arranged between the other pole of said source and said headlight means for selectively controlling the energization of any one of said filaments and having an extra contact connected with said other pole when said switch means is either in "off" position or in "on" position for said parking light filament;
   relay means including a coil in circuit with said source, and change-over contacts, and being movable by energization of said coil between a first position of said contacts in which said high beam filament is connected in circuit with said source and a second position of said contacts in which said low beam filament is connected through said selector switch means in circuit with said source, said relay means cooperating with said selector switch means in such a manner that said change-over contacts are effective only when said selector switch means is in a position permitting energization of said high beam filament, said relay means having one additional pair of normally open contacts connected in circuit with said extra contact and said high beam filament for causing, when said coil is energized, energization of said high beam filament when said selector switch means is in any position different from said position permitting energization of said high beam filament; and
   normally open switch means connected in said circuit between said coil and said source for causing, when moved to closed position, energization of said coil of said relay means.

7. In an arrangement for controlling the light emission of vehicle headlights, in combination,
   a source of electric energy having two poles;
   headlight means including a high beam filament, a low beam filament and a parking light filament, each of said filaments being connected at one end with one pole of said source;
   selector switch means movable between an "off" position and a plurality of "on" positions and arranged between the other pole of said source and said headlight means for selectively controlling the energization of any one of said filaments and having a first extra contact connected with said other pole when said switch means is in "off" position and a second extra contact connected with said other pole when said switch means is in "on" position for said parking light filament;
   relay means including a coil in circuit with said source, and change-over contacts, and being movable by energization of said coil between a first position of said contacts in which said high beam filament is connected in circuit with said source and a second position of said contacts in which said low beam filament is connected through said selector switch means in circuit with said source, said relay means cooperating with said selector switch means in such a manner that said change-over contacts are effective only when said selector switch means is in a position permitting energization of said high beam filament, said relay means having a first additional pair of normally open contacts connected in circuit with said first extra contact and said high beam filament for causing, when said coil is energized, energization of said high beam filament when said selector switch means is in said "off" position, said relay means having a second additional pair of normally open contacts connected in circuit with said second extra contact and said low beam filament for causing, when said coil is energized, energization of said low beam filament, when said selector switch means is in said "on" position for said parking light filament; and
   normally open switch means connected in said circuit between said coil and said source for causing, when moved to closed position, energization of said coil of said relay means.

8. In an arrangement for controlling the light emission of vehicle headlights, in combination,
   a source of electric energy having two poles;
   headlight means including a high beam filament, a low beam filament and a parking light filament, each of said filaments being connected at one end with one pole of said source;
   selector switch means movable between an "off" position and a plurality of "on" positions and arranged between the other pole of said source and said headlight means for selectively controlling the energization of any one of said filaments;
   first relay means including a coil in circuit with said source, and change-over contacts, and being movable by energization of said coil between a first position of said contacts in which said high beam filament is connected in circuit with said source and a second position of said contacts in which said low beam filament is connectable in circuit with said source, said relay means cooperating with said selector switch means in such a manner that said change-over contacts are effective only when said selector switch means is in "on" position for said high beam filament, said relay means having one additional pair of normally open contacts connectable in circuit with said source and said high beam filament for causing, when said coil is energized, energization of high beam filament when said selector switch means is in said "on" position for said high beam filament, and second relay means energizable by said source only when said selector switch means is in said "on" position for said high beam filament, and having change-over contacts connecting in normal position said other pole of said source with said additional pair of contacts of said first relay means, and connecting, when moved to its second position upon energization of said second relay means, said source through said selector switch means when said change-over contacts of said first relay means; and normally open switch means connected in said circuit between said coil and said source for causing, when moved to closed position, energization of said coil of said relay means.

References Cited in the file of this patent

UNITED STATES PATENTS

| | | |
|---|---|---|
| 2,177,618 | Montgomery et al. | Oct. 24, 1939 |
| 2,655,642 | Ayres et al. | Oct. 13, 1953 |